Dec. 4, 1951  E. M. STEINLE  2,577,284
METHOD OF MAKING IMPROVED HAND COVERINGS
Filed May 31, 1946  4 Sheets-Sheet 1
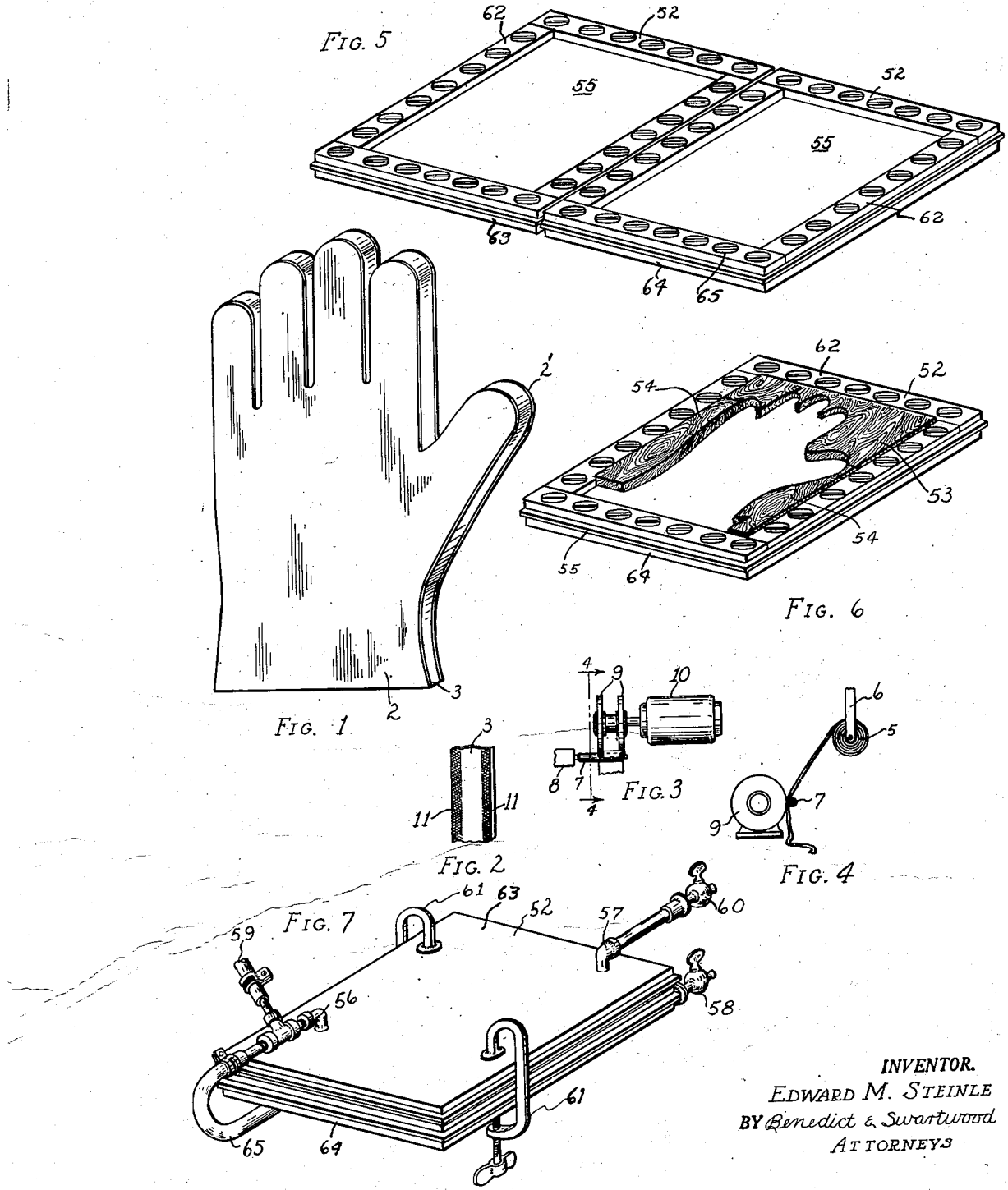
INVENTOR.
EDWARD M. STEINLE
BY Benedict & Swartwood
ATTORNEYS Dec. 4, 1951      E. M. STEINLE      2,577,284
METHOD OF MAKING IMPROVED HAND COVERINGS
Filed May 31, 1946      4 Sheets-Sheet 2
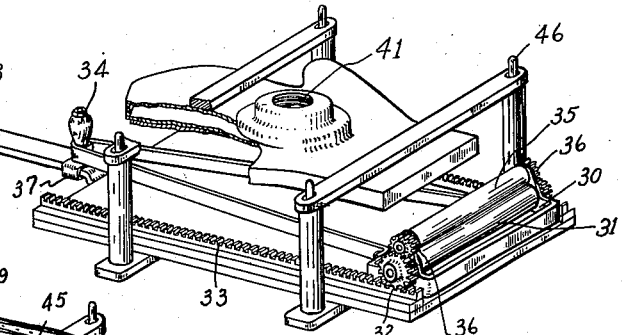
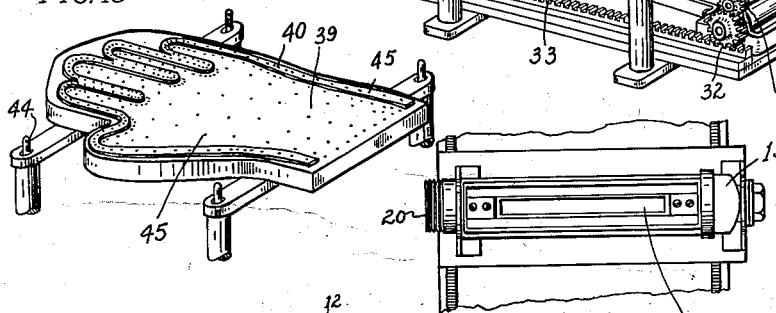
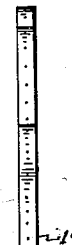
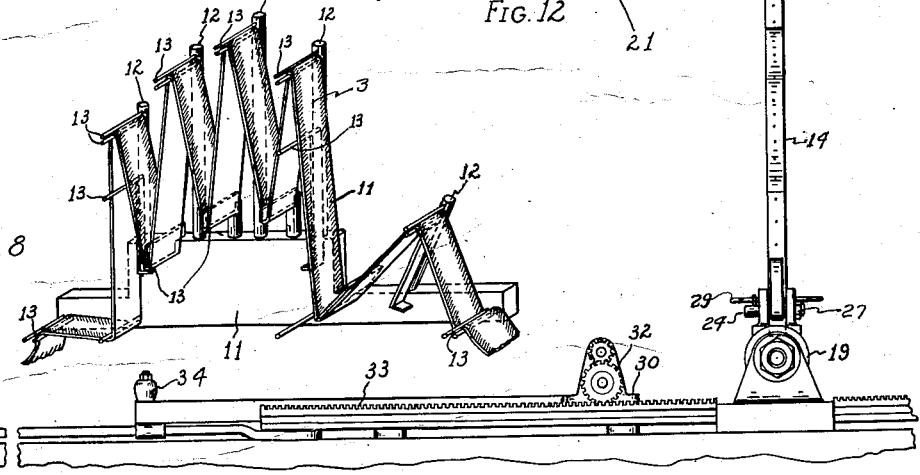
INVENTOR.
EDWARD M. STEINLE
BY Benedict & Swartwood
ATTORNEYS Dec. 4, 1951 E. M. STEINLE 2,577,284
METHOD OF MAKING IMPROVED HAND COVERINGS
Filed May 31, 1946 4 Sheets-Sheet 3
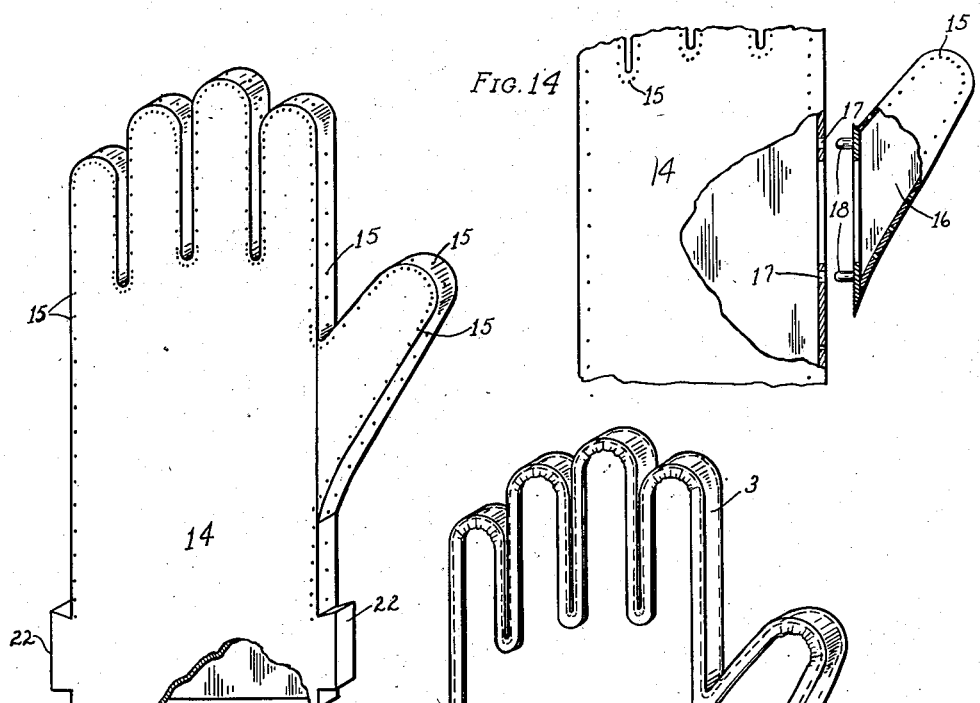
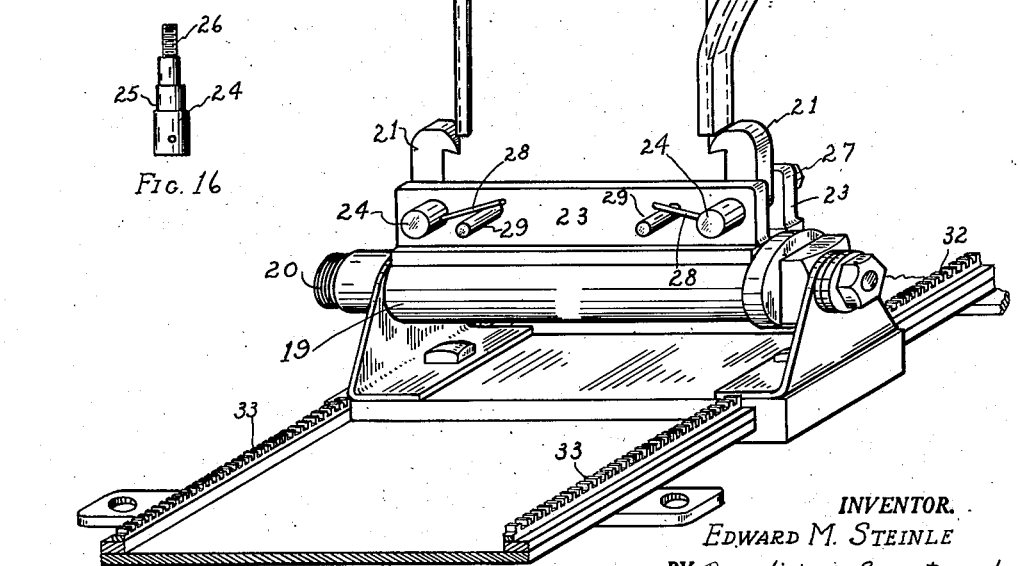
INVENTOR.
EDWARD M. STEINLE
BY Benedict & Swartwood
ATTORNEYS

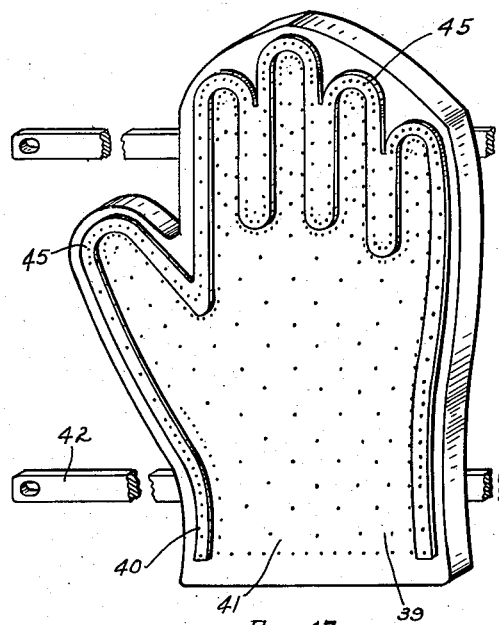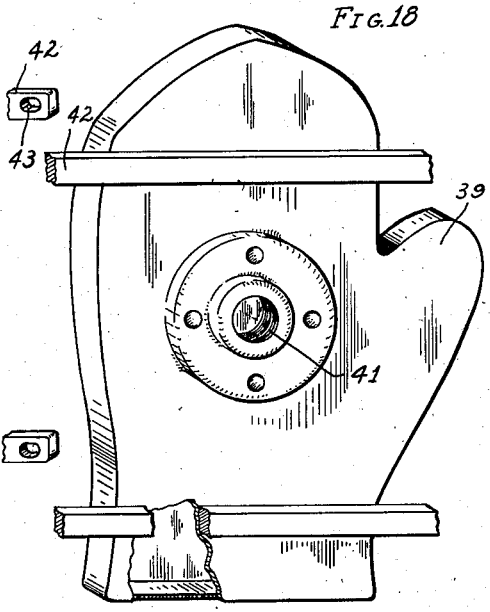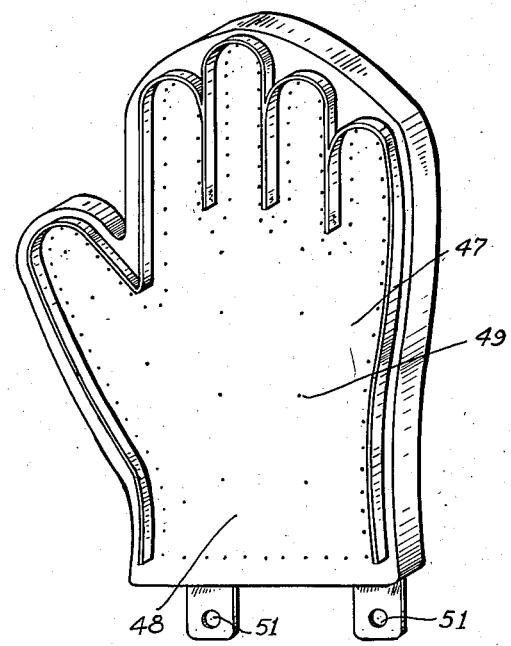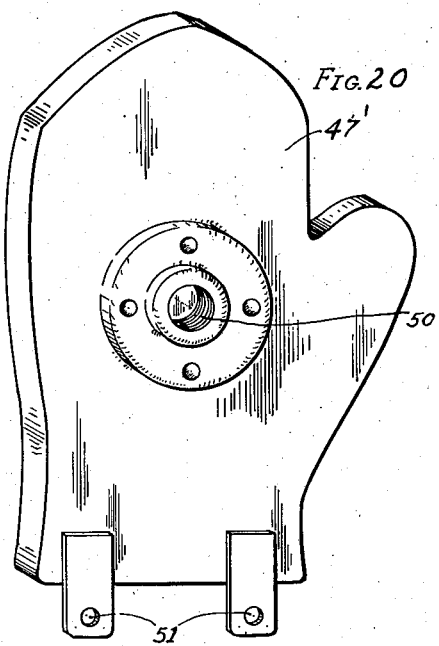

Patented Dec. 4, 1951

2,577,284

UNITED STATES PATENT OFFICE 2,577,284

METHOD OF MAKING IMPROVED HAND COVERINGS

Edward M. Steinle, Chicago, Ill., assignor to Illinois Glove Company, Champaign, Ill., a partnership Application May 31, 1946, Serial No. 673,441

4 Claims. (Cl. 2—169)

This invention relates to a method of making an improved hand covering.

It specifically relates to a method and apparatus for making an improved hand covering in which the hand sections have their marginal edges joined by an adhesive characterized by having bonding properties with hand covering materials and in which the adhesive serves as the only bonding means.

This invention involves a method and apparatus for the construction of all sorts of hand coverings including gloves, mittens, finger stalls, palm coverings and the like.

While it is within the purview of this invention to provide a method and apparatus for bonding two hand covering sections together along their marginal edges with any suitable adhesive, it particularly relates to a method and apparatus for bonding the marginal edges of the hand covering with a plastic material.

This invention contemplates the use of both thermoplastic and thermosetting materials as the adhesive, although the two are not to be considered equivalent since they may be used for different types of hand covering articles.

Some of the thermoplastic materials which are preferred because of their rapid bonding on heating include: rubber hydrochloride, vinyl resin, plasticized polyvinyl chloride, vinylidene chloride, and various cellulose derivatives such as cellulose nitrate. However it is also within the scope of this invention to use the following thermoplastic materials: polyvinyl acetal, casein and its derivatives, cellulose acetate, polystyrene, polyvinyl acetal, ethyl cellulose, polyvinyl formal, methyl methacrylate resin, polyvinyl butyrals, cellulose acetate butyrate, and vinyl chloride-acetate copolymer, etc.

Among the preferred thermosetting materials are vinyl resin formaldehyde, polyvinyl acetate emulsions, and phenol formaldehyde resins. However the following thermosetting materials may be used: urea formaldehyde, melamine formaldehyde, phenolic furfural, etc. It is within the scope of the invention to use the above plastic materials either alone or in admixture.

It is also within the scope of this invention to use certain plasticizers with any of the above materials, such as dibutyl phthalate, tributyl phosphate, toluene sulfonamide, tricresyl phosphate, methoxyethyl phthalate, and others. Also when it is desired to apply a coating of the plastic on the material to be bonded, various solvents may be used, such as toluol, alcohols, acetates, and the like.

Thermosetting materials form a bond with other materials upon heating, but thermoplastic materials after the heating step must be allowed to cool to fix the bond.

This invention contemplates the manufacture of an improved hand covering made of the usual materials for hand coverings, but instead of stitching or cementing the seams, either a thermoplastic or at thermosetting material, which forms a bond upon heating, may be used. For example, in the making of a leather glove, a plastic material in the seam between the leather sections may be used, which upon heating forms a bond. It is also useful in bonding together all types of fabrics, as well as leather materials.

There are many advantages in the use of a thermoplastic or thermosetting material for bonding the seams of hand covering articles such as gloves. The use of such a bonding edge permits a less bulky seam and the bond may be made between the various sections of the glove so that it does not need to be turned after the seam is bonded. It is the present practice in making gloves and similar articles that the seam is stitched inside out, and the glove must be turned, which is an expensive and time-consuming operation. By the use of plastic, a seam is obtained which is as strong or stronger than the glove material, which obviates the use of reenforcement along the seam. Such reenforcements are frequently applied along the seams of the gloves of the Gunn-cut type which are to be used in heavy-duty work. Furthermore, the seams are not nearly as bulky and there is more flexibility as to the positioning of the seams. At the present time, the seams of gloves which are used either in heavy-duty work or in work where the gloves must protect the hands from high temperatures, the seams must be placed where they will not be exposed to excessive wear or excessive heat. This often causes a waste in the glove material, since the sections cannot be cut in the most economical manner. By use of a plastic bond at the seam instead of stitching or cementing not only is a stronger bond obtained, but there is more flexibility in the placing of the seams.

By the use of a plastic bonding agent in the seams, an advantage is obtained over stitching since the glove covering material is not repeatedly punctured by the fabricating needle, which tends to weaken the glove at the seam. Moreover, such repeated puncturing in many instances causes a distortion of the glove and causes an unsightly wrinkling effect at the seam.

Also, by the use of a thermoplastic or thermosetting bonding agent, the glove is just as impervious to liquids, gases, and other foreign substances at the seam as is any part of the rest of the glove, which is not the case where stitching is used.

It is another object of this invention to provide an improved method and apparatus for applying the adhesive along the marginal edges of the hand covering to be joined.

It is still a further object of this invention to provide an improved method and apparatus for mechanically handling the various hand covering sections during the application of the adhesive and the assembly of the final hand covering.

Another object of the invention is to provide an improved method and apparatus for heat bonding and pressuring of the marginal edges after the adhesive coating is applied thereby forming the final hand covering.

While the description herein is specifically directed towards the making of a glove, the principles illustrated herein are equally applicable to the manufacture of other types of hand covering such as mittens and the like.

Also while the description herein is specifically directed towards the formation of a reversible glove which may be worn on either hand and in which the main glove sections are joined by a continuous fourchette, other types of glove patterns may also be made within the scope of my invention.

Other advantages, uses and objects of my invention will become apparent by referring to the drawings in which Figure 1 shows one example of the type of glove or hand covering that can be made by my invention. i. e. a reversible glove.

Figure 2 shows the continuous fourchette used in making the glove of Figure 1 after its marginal edges have been skived by the skiving apparatus shown by Figures 3 and 4.

Figures 5, 6 and 7 illustrate the heating and pressuring apparatus for heat sealing the glove or hand covering after it has been prepared for heat sealing.

Figure 8 shows the apparatus used for placing the fourchette, after it has been skived, on the form 14 preparatory to applying the amount of adhesive.

Figure 9 is a side view and Figure 15 is a perspective view of the apparatus used for applying the adhesive to both sides of the continuous fourchette.

Figure 10 is the form used for placing the blank pattern of the glove preparatory to applying the adhesive. While not shown, there must be a corresponding form for the other side of the glove.

Figure 11 shows the form of Figure 10, to which has been applied the glove blank, in position for applying the adhesive to the glove blank.

Figure 12 is a plan view of part of the apparatus shown in Figure 9 with the form 14 removed.

Figure 13 is a form which is used for holding the fourchette in place during application of the adhesive as shown in Figure 15.

Figure 14 is a partial view of Figure 13 showing the thumb as detachable. Figure 16 is a detail of the eccentric 24 shown in Figure 15.

Figure 17 is a front view and Figure 18 is a back view of the apparatus shown in Figure 10.

Figure 19 is a front view and Figure 20 is a back view of the form used for holding the glove blank after the adhesive is applied and preparatory for joining the glove blank with the continuous fourchette.

Referring to Figure 1, the blank 2 or pattern of the glove is cut in the usual manner. A corresponding blank 2' is also cut. The two blanks 2 and 2' are not referred to as front and back since the glove shown in Figure 1 is reversible. It can be worn on either hand.

The continuous fourchette 3 is also cut or stamped out in the usual manner. After the fourchette 3 is cut, it is skived in the apparatus shown in Figures 3 and 4. The fourchette is rolled in the form of roll 5 (in Figure 4), journalled in the bracket 6, and then passed over the relatively small guide roller 7, journalled in support 8. Emery wheels or other abrasive wheels 9 driven by motor 10 are provided. The emery wheels 9 are spaced the right distance apart in order to skive or roughen the continuous fourchette along each marginal edge forming skived edges 11 as shown in Figure 2.

The skiving of the continuous fourchette not only provides a better surface for the application of the adhesive or cement, but also makes a better joint with the glove sections 2 and 2' because it lessens to some extent the thickness of the material at the joints. Referring again to Figures 3 and 4, the size of the guide roller 7 is of extreme importance. Emery wheels 9 varying from 4 to 8 inches in diameter may be used. With such wheels it has been found that the guide roller 7 must be less than 1/4" in diameter otherwise burning of the leather or other hand covering material in the fourchette occurs. It has been found that if the guide roller is less than 1/4" it is impossible to burn the leather. This is an important advantage for my apparatus.

After the fourchette is skived as shown in Figure 2, it is placed on the apparatus shown in Figure 8. This apparatus comprises a base 11 with supporting rods 12 having detachable guide pins 13. The fourchette is placed on the device as shown in Figure 8 between the various guide pins 13 which hold the fourchette in place during the time it is applied to the form 14 shown in Figure 13. The continuous fourchette is in place on form 14 as illustrated in Figure 15. Figure 13 shows the construction of the form 14 shown in Figure 15. Referring to Figures 13 and 14, the form 14 which corresponds approximately to the inner space of the glove may be made of brass or any other suitable metal material. A number of holes 15 are provided. The interior of form 14 is hollow and when a vacuum is placed on the interior of 14, the fourchette is held to the form 14 by means of the vacuum in the manner shown in Figure 15.

Referring specifically to Figure 14, the thumb portion 16 of the form 14 is detachable and is detachably connected to the form 14 through pins 18 inserted into openings 17. The form 14 is securely attached to a source of vacuum as shown in Figure 15 and as hereinafter is described. Referring to Figure 15, a rotatable hollow pipe 19 is provided having an opening 20 which is connected to a vacuum pump or to other means for providing suitable vacuum within the interior the hollow form 14. This is also shown in Figures 9 and 12. The pipe 19 has an opening 21 (see Figure 12) which connects to the inside of the form 14 when the form 14 is in the position shown in Figure 15. Referring to Figure 15, hook clamps 21 are provided which coact with the extended portions 22 shown in Figure 13. Through the hook clamps and through the side extension portions 23 of the pipe 19 are inserted the eccentrics 24. Figure 16 shows the construction of eccentric 24. The eccentric butts against the front portion of 23 by means of the shoulder portion 25 and the other end 26 of the eccentric is threaded and fastened on the back side by the nut 27 as shown in Figure 15. After the form 14 is placed in the device as shown in Figure 15, the eccentrics are turned by means of the pins 28 in the direction of the pins 29 until they come to rest on the pins 29 and due to the design of the eccentric the clamps 21 are tightened thereby sealing the inside of the form 14 tightly against the opening 21 of Figure 12 forming a continuous passageway to the vacuum pump and thus the interior the form 14 may be evacuated. The interior of form 14 is now evacuated and the fourchette is placed on the form by means of the apparatus of Figure 8 by placing the form 14 under the fourchette 3 which is held in generally the shape of a glove by the pins 13. By smoothing the skived edges 11 of the fourchette 3 on both sides of the form 14 covering all of the pin holes 15 shown in Figure 13, the vacuum holds the fourchette in place for the next operation. The removable pins 13 of the apparatus shown in Figure 8 are then removed and the apparatus of Figure 8 can then be taken away and the fourchette 3 remains in place as shown in Figure 15.

The next step is applying the adhesive or cement to the exposed edges of the fourchette which are held in place by the vacuum as shown by Figure 15. Referring to Figures 9 and 11, a suitable cement is placed in the reservoir 30. The adhesive applying device of Figure 9 is the same as the one shown in Figure 11, and therefore the description of one will suffice for both. The lowermost roller 31 is rotated by means of the cogs 32 and the cogs 32 are rotated by pulling the entire device along the tracks 33 by means of the knob 34. The upper roller 35 is driven by the cogs 36 which mesh with the cogs 32. The two rollers 31 and 35 are then driven in opposite directions and the roller 31 is adapted and arranged to dip into the adhesive reservoir 30 causing a portion of the adhesive to adhere to the roller 31 and in turn the roller 35, by being in contact with the roller 31, also picks up some of the adhesive. It is preferable that the rollers 31 and 35 be of some resilient material such as hard rubber and the like. The handle 34 is slidably attached by means of the clamp 37 which slides back and forth on the extension bar 38. Therefore the adhesive is applied to the fourchette in the following manner. The form 14 to which the fourchette is held on by suction shown in Figure 14 is first rotated to the left from the position shown in Figure 9 so that it rests on the uppermost roller 35 and the handle 34 is used to push the adhesive applying device back and forth thereby applying adhesive to the exposed edges of the fourchette. It is then rotated through an angle of 180° towards the right where a similar adhesive applying device (not shown) applies adhesive to the other side of the fourchette.

The blank sections 2 and 2' of the glove must next have the adhesive applied. For this purpose the apparatus shown in Figures 10, 17 and 18 is provided. Referring to Figures 17 and 18, a hollow form corresponding to the approximate interior volume of the glove is provided. The hollow form is referred to as 39. Referring particularly to Figures 10 and 17, the front face of the form has a raised portion 40 which is raised about 1/8" from the main portion 41 and the thickness of the raised section 40 corresponds to approximately the width of the skived portion on the fourchette or in other words to the marginal edge of the blank 2 to which the adhesive is to be applied. Figures 10 and 17 show the device used to hold the glove blank 2 during the application of the adhesive. A similar form or mirror image of form 39 must also be provided for blank 2' but such form is not illustrated since the description of the form 39 and its use in connection with blank 2 suffices.

Referring to Figure 18, the opening 41 is provided which connects to a suitable source of vacuum such as a vacuum pump. Supporting arms 42 are provided with openings 43. The form 39 is held in place by means of pegs 44 extending through the openings 43 during the time blank section 2 of the glove is placed on the form 39. It should be noted that form 39 has a large number of relatively small openings 45 which are of the order of pin-point size or perhaps slightly larger for firmly holding blank 2 to the form 39 when the interior of the form 39 is evacuated through opening 41. These openings extend to the hollow portion within the form 39 and by means of these pin holes the blank 2 is firmly held in place on the form 39. After the blank 2 is properly placed on the form 39, the form 39 still attached to the vacuum is reversed and placed on the pins 46 as shown in Figure 11 and adhesive applied to the marginal edges of the blank 2 in the same manner as adhesive is applied to the fourchette as previously described. The adhesive is limited to the marginal edges of blank 2 and is not applied to the entire surface because the raised portion 40 (see Figure 10) causes only the marginal edge of the blank 2 to be coated when the adhesive is applied as shown in Figure 11. After adhesive has been applied to the marginal edges of the glove blank 2, the vacuum is removed. The blank 2 with adhesive applied to its marginal edges is then placed in the hollow form 47 which is shown in Figures 19 and 20. Again a similar form must be provided for blank 2'. The face 48 of the form 47 is recessed to about one-half the thickness of the form 14 for the purpose that will hereinafter be described. Again pin point openings 49 connect to the interior of the form 47 and vacuum may be applied by means of a connection attached to the opening 50.

It is understood that Figures 17, 18, 19 and 20 only show one of the forms required. A corresponding form for the blank 2" must be provided and each of the blanks 2 and 2' have the adhesive applied in the manner just described for the blank 2.

The blanks 2 and 2' after the adhesive has been applied are placed in a pair of forms 47 (Figure 19) and held in place by means of the vacuum. The pair of forms 47 containing the adhesive treated blanks 2 and 2' are placed on each side of the form 14 (see Figure 15) containing the adhesively coated fourchette in the following manner. The eccentrics 24 are turned away from the pins 29 by means of pins 28 and the pair of forms 47 are placed on each side of the form 14 so that the pins 29 enter the openings 51 and the eccentrics are again turned in order to clamp the entire device in place. The vacuum is now removed on the form 47 and due to the fact that the marginal edges of the blanks 2 and 2' and the continuous fourchette have been adhesively treated, the blanks 2 and 2' will now adhere to the continuous fourchette as held in place on form 14 as shown in Figure 15. The eccentrics 24 are now again turned releasing the entire device. The forms 47, since the vacuum is removed, will readily come away from the blanks 2 and 2' leaving them in place on the form 14 attached to the fourchette.

It is now apparent that the glove is in place and in its final shape on the form 14 and the glove is ready for a heat treatment to form a bond between the adhesive and the marginal edges of the continuous fourchette and the blank sections 2 and 2'. The form 14 containing the entire glove is now removed and the glove is heat treated and pressured by means of the apparatus shown in Figures 5, 6 and 7.

Referring to Figures 5 and 6, the heating and pressuring device comprises the two halves 52 shown in open position. Strips 62 and top and bottom portions 63 and 64 respectively have placed between them a pliable rubber material indicated by the numeral 55. The rubber material is held in between strips 52 and front and back sections 63 and 64 by means of screws 65.

Referring to Figure 6 which shows the right hand portion of the pressure device of Figure 5, a wooden block form 53 which is sufficiently thick to extend slightly above the edges of the strips 62 is provided having a cut away section 54 into which is inserted the form 14, holding the entire glove ready for bonding treatment as has been described above. The two sections 52 of Figure 5 are now folded together in a manner shown in Figure 7 and are held together by means of the clamps 61 during the pressuring and heating treatment.

Referring to Figure 7, a connection 56 extends through the top section 63 and steam is passed through hose 59 through connection 56 thereby placing pressure on the upper section 55 which places pressure on to the glove in position on the form 14. The steam also serves as a means for heating the glove during the heating and pressuring treatment. The steam leaves the top section 63 through the opening 57 where it may be bled off by means of the valve 60. In a similar manner steam is introduced through the bottom section 64 by means of the hose connection 65 and a connection similar to 56 and the steam in that section is bled off through the valve 58.

Thus both the top and bottom sections 63 and 64 not only heat treat the glove but also provide a pressuring means for obtaining the bond between the marginal edges of blanks 2 and 2' and the continuous fourchette 3. The glove is left in the device shown in Figure 7 for a matter of minutes and then the clamps 61 are removed and the form 14 holding the heat treated glove is removed. The glove is now completely formed and may be readily removed from the form 14 thereby producing the glove shown in Figure 1.

The diaphram arrangement shown in Figures 5 and 6 has the following advantages.

1. It applies pressure perpendicular to all surfaces.
2. It enables the operator to control the pressure and temperature.
3. It applies pressure to all parts of the hand covering during heat sealing.

Other modifications of my invention may be made within the scope of the following claims.

I claim as my invention:

1. A method of making a hand covering having its marginal edges joined by and adhesive comprising preforming hand covering sections from a hand covering material, placing each section on a hollow form having minute openings in the surface with said openings connecting to the interior of the hollow form, evacuating the interior of the hollow form thereby holding each section on each of the forms by means of the vacuum exerted through said minute openings, applying adhesive to the marginal edges of each section while the sections are so held, assembling the entire hand covering on one of the hollow forms while maintaining the evacuation of the interior of the latter form so that the adhesively coated marginal edges are joined, disconnecting the evacuation means from said latter form, placing the latter form holding the assembled hand covering in a press having a resilient lining, passing a heated fluid around the side of resilient lining, opposite the side of the lining which is adjacent to the form holding the formed hand covering, for sufficient time to join the marginal edges with said adhesive thereby forming a seal, removing the latter form from said press and then removing the finished hand covering from the latter form.

2. The steps in the method of making a hand covering having its marginal edges joined by an adhesive comprising assembling a plurality of hand covering sections, which have previously had their marginal edges coated with an adhesive, on a master form such that the marginal edges of the sections are joined, placing the master form in a press having a resilient lining, passing steam around the side of the resilient lining opposite the side of the lining, which is adjacent to the form holding the formed hand covering for a sufficient time to join the marginal edges with said adhesive thereby forming a seal, removing the latter form from said press and then removing the finished hand covering from the latter form.

3. The method of forming a hand covering which comprises the steps of assembling preformed sections of the hand covering on a form, holding the sections in place by means of vacuum, and then bonding the sections together by means of an adhesive.

4. The method of forming a hand covering which comprises the steps of assembling preformed sections of the hand covering, the marginal edges of which are coated with a thermoplastic adhesive, on a form, holding them in place by means of vacuum, and then heating them to bond the sections together.

EDWARD M. STEINLE.

REFERENCES CITED

The following references are of record in the file of this patent:

UNITED STATES PATENTS

| Number | Name | Date |
|--------|------|------|
| 1,482,758 | McFarland | Feb. 5, 1924 |
| 1,967,704 | Bunn | July 24, 1934 |
| 2,060,616 | Fleischer et al. | Nov. 10, 1936 |
| 2,136,826 | Schur | Nov. 15, 1938 |
| 2,394,532 | Shmikler | Feb. 12, 1946 |